3,606,200
TAPE TENSION CONTROL SYSTEM WITH A SENSING LEVER, PARTICULARLY FOR MAGNETIC SOUND RECORDERS
Hubert O. Richt, 4 Buchenweg, 8135 Soecking, Germany, and Albert Liebl, 12 Am Muhleich, 813 Starnberg, Germany
Filed Aug. 23, 1968, Ser. No. 757,806
Claims priority, application Germany, Aug. 24, 1967, P 15 49 043.4
Int. Cl. B65h 59/38, 63/02; G03b 1/04
U.S. Cl. 242—189
6 Claims

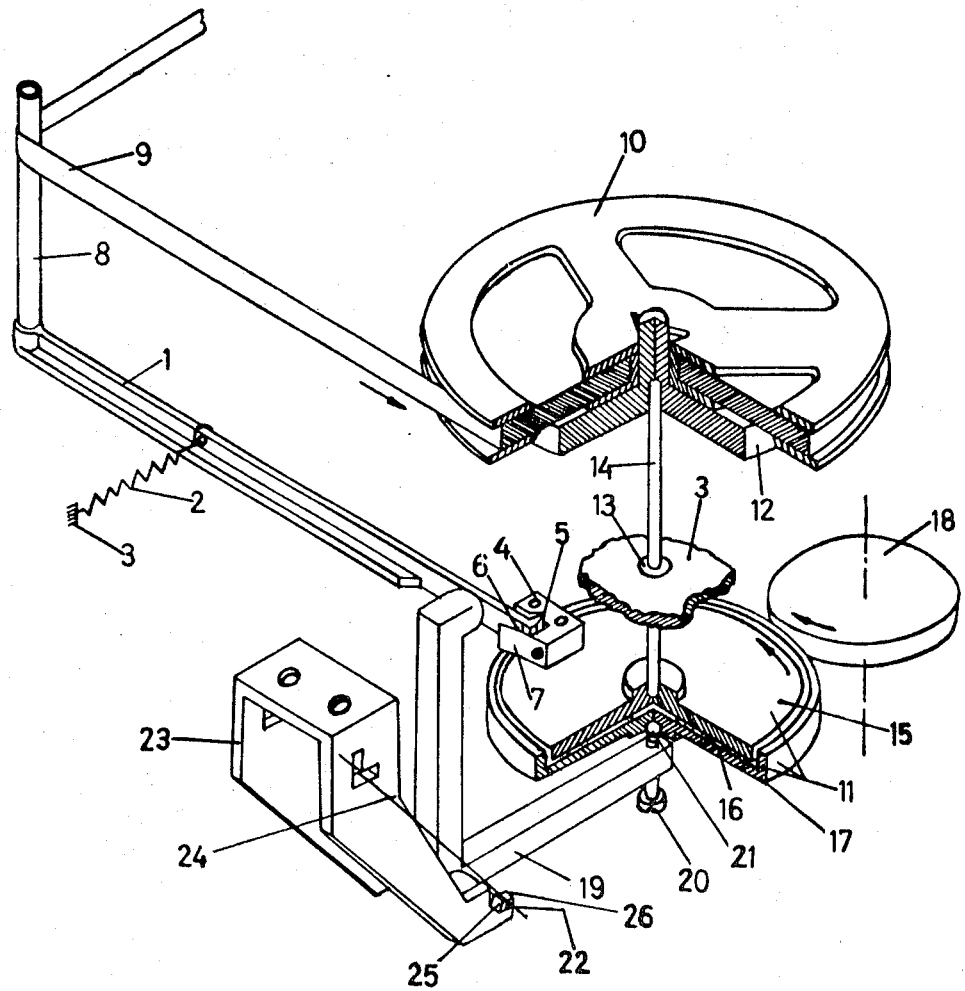

ABSTRACT OF THE DISCLOSURE

An apparatus for regulating the tension of a tape moving between two reels on a tape recorder. A sensing lever is biased by a spring to hold a preselected tension on the tape. If the tension on the tape is above or below the desired value, the sensing lever moves the first arm of a bell crank lever, the second arm of which is connected to a variable friction clutch in order to vary the speed of the reel to adjust the tape tension.

---

The invention relates to a tape tension control system, particularly for magnetic sound recorders, with a sensing lever which senses, from the tape, the respective actual value of tape tension and is pivoted against a spring force which represents the desired value of tape tension, and with a tape winding clutch serving as a final control element.

It is well known to control the tape tension of magnetic sound recorders by utilizing a sensing lever. The sensing lever is either connected to a brake which, in turn, acts on the turntable, or it adjusts a rheostat, thereby changing the rotational speed of the tape winding clutches via the driving motor. Likewise it is known to make the sensing lever act, via cable lines, on the tape winding clutch, for the purpose of controlling the tape tension.

It appears that those known embodiments of tape tension control systems do not fully meet what is expected from them. Worn brakes result in improper braking action, the wear of rheostats will cause faulty contact, and cable lines which always possess a certain amount of elasticity will cause delays and do not provide a defined action of force during dynamic operation. Moreover, irreversible stretching of the cable line is to be expected, thus making readjustments necessary. It is particularly disadvantageous to include the driving motor with all its control characteristics (which must also be taken into account) in the tape tension control system.

It is the object of the invention to provide a purely mechanical tape tension control system of uncomplicated construction, which can easily be manufactured and which avoids the disadvantages of the known systems.

According to the invention this problem is solved by using a rigid sensing lever which is pivoted against a spring force, about an axis which is vertical with respect to the chassis plane, transmits the difference of forces between the spring force and the tape tension, via a likewise rigid intermediary lever pivoted about an axis which is horizontal with respect to the chassis plane, directly to a friction clutch, thereby influencing the transmitted torque of the clutch for the purpose of controlling the tape tension. In contrast to the known solutions this kinematic system operates with extremely short delay, as it consists of rigid elements. Moreover, an over-all ratio of the sensing lever and the intermediary lever has been selected which is so great that even minute changes of the tape tension produce great actuating forces for the friction clutch. These great forces allow the use of a normal friction clutch having only a single lining. This fact contributes considerably to the economical advantages of the tape tension control system of the present invention. Since, due to the great ratio of the load transmission, the deviations of the intermediary lever are reduced, the end of the intermediary lever, by which the friction clutch is actuated, moves only minutely. This implies the use of a hard friction lining for the clutch, i.e. one of low compressibility. Since the movements of the sensing lever and the intermediary lever, which result from discontinuities of the tape tension, are very minute, the mass forces which act on the sensing lever and the intermediary lever, are extremely small. According to a particularly advantageous embodiment of the invention the sensing lever as well as the intermediary lever are of low mass and are, if possible, supported in their respective centers of gravity. Thus, the mass inertia of the kinematic system is further reduced, a fact which increases the quality of the control system.

Since the sensing lever and the intermediary lever perform only minute swivelling movements, they are, according to the invention, supported in prism bearings. This kind of suspension proves to be particularly advantageous due to its low-loss performance and, simultaneously, the absence of play which guarantees a precise "no-clearance" fit while it constitutes an economical easy-to-manufacture design. According to a preferred embodiment of this kind of suspension, the sensing lever and the angular lever are manufactured in an injection-moulding process in which, simultaneously, prism-shaped projections are produced which serve as bearing prisms.

From the point of view of the design of magnetic sound recorders it appears to be advantageus to design the intermediary lever in the form of an angular lever. Thus, further intermediary members for the actuation of the friction clutch can be dispensed with. Thereby, the entire construction of the control system is further simplified.

Despite the fact that the entire control system consists of only three parts, i.e. the sensing lever, the intermediary lever and the tape winding clutch which serves as the final control element, adjusting means must be provided in order to compensate production tolerances. In a preferred embodiment of the control system according to the invention, this is achieved by the provision that the intermediary lever does not influence the friction clutch directly, but via a set screw. It is equally effective to arrange the set screw on the other end of the intermediary lever, i.e. where it meets the sensing lever, or on the sensing lever itself. This adjusting device serves solely for the compensation of production tolerances and does not relate to tape tension. The amount of tape tension depends solely on the tension of the spring which holds the sensing lever.

Since the tape winding clutch rotates, when in operation, and the intermediary lever or its set screw respectively, simultaneously presses against the bottom side of the clutch, there is a danger of friction which might result in wear and heat. The invention takes this into account by placing a ball bearing between the lower clutch section and the intermediary lever or its set screw, as the case may be. According to a preferred, i.e. equally effective and uncomplicated embodiment, the intermediary lever or its set screw presses against a single ball which is supported in the lower clutch section.

In similar manner it may be advantageous to arrange a bearing ball or roller at the point of contact between the sensing lever and the intermediary lever in order to provide a low-loss load transmission. However, this is not an important requirement, as the relative movements of sensing lever and intermediary lever, at their common point of contact, are so minute, due to the ratio of leverage, that considerable friction losses will not occur. Therefore, another embodiment of the invention is restricted to a ball-shaped design of that end of the intermediary lever which is in contact with the sensing lever; thus, friction effects are largely avoided.

The aforementioned requirement for a low-mass design of the sensing lever and the intermediary lever, in order to minimize inertia, is also met in that the tape guide which is arranged on the sensing lever, is made of a thin-walled tube, for example of German silver, and that the sensing lever as well as the intermediary lever are preferably made of a light metal, e.g. of aluminum or an alloy named "Elektron."

An embodiment of the invention is shown in the drawing and is subsequently described in detail.

The drawing shows a tape tension control system in a magnetic sound recorder while the tape is being wound.

A sensing lever 1 which consists of a light metal and has been manufactured by an injection moulding process, is held by a spring 2 which, in turn, is connected to the chassis 3 of the recorder. The sensing lever 1 is supported in a prism bearing 5 of a bearing block 4 which, in turn, is also mounted on the chassis 3 of the recorder.

A flat spring 6 is inserted in the sensing lever 1. A second flat spring 7 which is screwed to the bearing block 4, presses against this flat spring 6. Thus, the sensing lever 1 can move easily in the prism bearing 5 by which it is supported. The sensing lever 1 also carries a tape guide 8 which is made of a tube of German silver. The sound tape 9 which is wound on the reel 10, loops around the tape guide 8. The reel 10 is carried on a tape winding clutch 11 which operates independently of the weight of the reel carried by it. The weights of the reel 10, the sound tape 9 wound on it, and of the turntable 12 on which the reel 10 rests, are absorbed by a bearing 13 for the clutch shaft 14 which is located in the chassis 3 of the recorder. Moreover, the clutch shaft 14 is positively connected to the upper clutch section 15. Thus, the weight of the upper clutch section 15 is also absorbed by the bearing 13 of the clutch shaft 14. The upper clutch section 15 has a friction lining 16. The lower clutch section 17 is driven by a driving wheel 18 and is pressed against the upper clutch section 15 by the intermediary lever 19 which has the form of an angular lever or bell crank. The transmitted torque of the clutch 11 corresponding to the amount of the force which the intermediary lever 19 exerts on the lower clutch section 17. The intermediary lever 19 which is made of a light metal and by an injection-moulding process, preferably includes a set screw 20 which is able to compensate for manufacturing tolerances of the entire control system. A ball 21 is arranged between the set screw 20 and the lower clutch section 17. The intermediary lever 19 is supported in its center of gravity by means of the prism bearings 22. The bearing bracket 23 is rigidly connected to the chassis of the recorder. A spring 24 presses a corresponding prism-shaped pivot 25 of the intermediary lever 19 against a recess 26 in the bearing bracket 23, thereby keeping the intermediary lever 19 in place.

The spring force of the spring 2 represents the desired value of the tape tension. If the momentary tape tension is lower than the desired value, the spring 2 is shortened. The sensing lever 1 moves and transmits the difference of forces between the spring tension (desired value) and the momentary tape tension (actual value) via the intermediary lever 19 to the tape winding clutch 11 so as to increase its transmitted torque. This transmitted torque will increase until the desired tape tension is obtained. Then, the tension of the spring 2 equals the tape tension. The difference of forces transmitted by the sensing lever 1 via the intermediary lever 19 has become zero. This means that the sensing lever 1 and the intermediary lever 19 remain in their respective momentary positions and that the transmitted torque of the tape winding clutch 11 as well as the tape tension remain constant. Since the diameter of the tape roll on the reel 10 increases continuously, the transmitted torque of the tape winding clutch 11 is continuously increased in order to keep the tension of the sound tape 9 constant along the entire diameter of the tape roll.

If the momentary tape tension is greater than the desired value, the spring 2 is stretched beyond its normal position. The difference of forces which the sensing lever 1 transmits, in this case, via the intermediary lever 19, to the tape winding clutch 11 has therefore such a direction as to decrease the momentary transmitted torque of the tape winding clutch 11. With decreasing transmitted torque the tape tension decreases simultaneously until it has reached the desired value.

We claim:

1. Apparatus for regulating the tension of a recording tape moving from a storage reel to a take-up reel, each of said reels being independently driven by a variable friction mechanical clutch comprising:
   (a) a rigid sensing lever pivotally supported in a prism bearing to move in a plane substantially parallel to the path of said tape;
   (b) a finger extending from said lever to engage said tape;
   (c) resilient biasing means to maintain a predetermined tension on said lever and finger, against said tape;
   (d) a rigid bell crank lever pivotally mounted in a prism bearing having a first arm engaging said sensing lever and a second arm engaging said variable friction clutch whereby increased tension on said tape works against said biasing means causing less clutch friction and decreased tension on said tape enabling said biasing means to cause more clutch friction.

2. Apparatus for regulating the tension of a recording tape moving from a storage reel to a take-up reel, each of said reels being independently driven by a variable friction mechanical clutch comprising:
   (a) a rigid sensing lever pivotally mounted to move in a plane substantially parallel to the path of said tape;
   (b) a finger extending from said lever to engage said tape;
   (c) resilient biasing means to maintain a predetermined tension on said lever and finger, against said tape;
   (d) a pivotally mounted rigid bell crank lever having a first arm engaging said sensing lever and a second arm carrying a set screw which engages said variable friction clutch whereby increased tension on said tape works against said biasing means causing less clutch friction and decreased tension on said tape enabling said biasing means to cause more clutch friction.

3. Apparatus of claim 2 in which a ball bearing is positioned between the set screw and the clutch.

4. Apparatus of claim 2 including a ball or roller bearing between the first arm of the bell crank and the sensing lever.

5. Apparatus of claim 2 in which said finger is a tube of a material of high inherent lubricity.

6. Apparatus for regulating the tension of a recording tape moving from a storage reel to a take-up reel, each of said reels being independently driven by a variable friction mechanical clutch comprising:

(a) a rigid sensing lever pivotally mounted to move in a plane substantially parallel to the path of said tape;
(b) a finger extending from said lever to engage said tape;
(c) resilient biasing means to maintain a predetermined tension on said lever and finger, against said tape;
(d) a pivotally mounted rigid bell crank lever having a first arm parallel to the axis of rotation of the reel to which it is associated and engaging said sensing lever and a second arm parallel to the plane of rotation of the reel to which it is associated and engaging said variable friction clutch near the axis of rotation of the reel to which it is associated whereby increased tension on said tape works against said biasing means causing less clutch friction and decreased tension on said tape enabling said biasing means to cause more clutch friction.

References Cited
UNITED STATES PATENTS

| | | | |
|---|---|---|---|
| 2,725,200 | 11/1955 | Ward | 242—189 |
| 2,745,604 | 5/1956 | Masterson | 242—189 |
| 2,855,160 | 10/1958 | Fundingsland | 242—187 |

LEONARD D. CHRISTIAN, Primary Examiner

U.S. Cl. X.R.

242—75.5